Jan. 19, 1960     E. G. COOK     2,921,465
ACOUSTIC TRANSLATING DEVICE
Filed April 10, 1957     2 Sheets-Sheet 1
FIG. 1
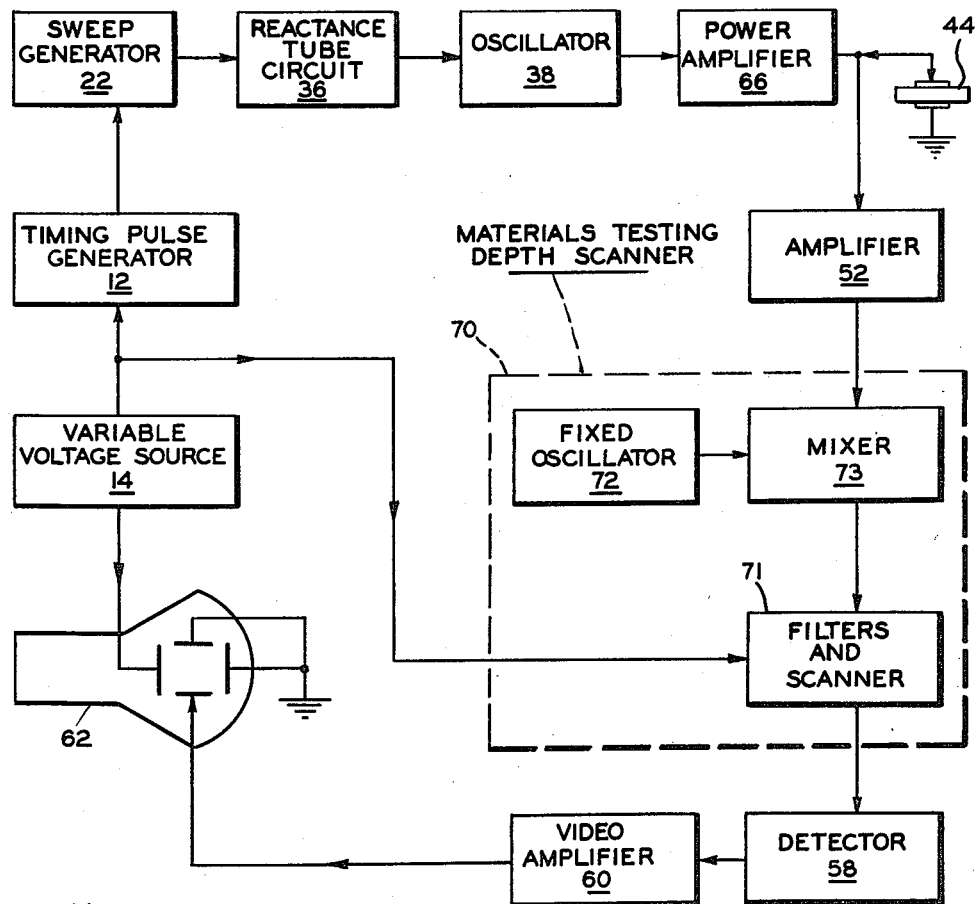
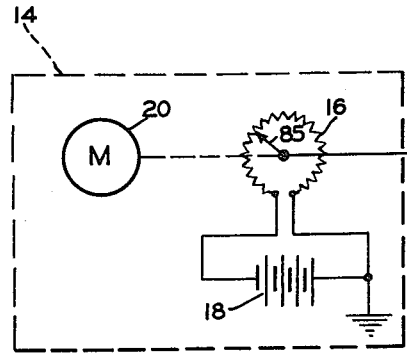
FIG. 5
INVENTOR.
EDWARD G. COOK
BY
*Herbert J. Smith*
ATTORNEY

United States Patent Office 2,921,465
Patented Jan. 19, 1960

2,921,465

ACOUSTIC TRANSLATING DEVICE

Edward G. Cook, Packanack Lake, N.J., assignor to Curtiss-Wright Corporation, a corporation of Delaware Application April 10, 1957, Serial No. 652,008

2 Claims. (Cl. 73—67.7)

This invention relates to systems for detecting flaws in materials, and more particularly to frequency modulated systems usable to simultaneously detect and accurately indicate flaws lying at different depths in material to be tested.

It is an object of the present invention to provide a novel system for detecting and indicating flaws in material to be tested.

A further object is to provide a novel frequency modulated system wherein a sweep range is employed in conjunction with a scanning arrangement to detect and indicate flaws lying at different depths in material.

Another object is to provide a novel frequency modulated system wherein a single sweep range is used in conjunction with a spectrum analyzer to indicate flaws in material under test.

Another object is to provide novel ultrasonic flaw detecting apparatus employing a sweep range with the beginning and end points of each sweep being substantially identical.

The present invention contemplates a frequency modulated system wherein a single sweep range is employed in conjunction with a material testing depth scanner or spectrum analyzer to simultaneously detect and indicate flaws lying at different depths in material to be tested. The depth scanner includes a plurality of filters which may be of the piezoelectric or magnetostrictive type, with each filter being a relatively narrow band filter and for a different frequency range, so that a multiplicity of different range filters may be periodically and repetitively scanned to embrace a complete depth range of material under test.

The foregoing and other objects and advantages of the invention will appear more fully hereinafter from a consideration of the detailed description which follows, taken together with the accompanying sheets of drawings wherein several embodiments of the invention are illustrated by way of example. It is to be expressly understood, however, that the drawings are for the purpose of illustration and description only and are not intended as a definition of the limits of the invention.

Fig. 1 illustrates an embodiment of the invention showing one arrangement of the system utilizing a materials testing depth scanner or spectrum analyzer.

Fig. 5 is a representative schematic view of a variable voltage source.

Figure 2:
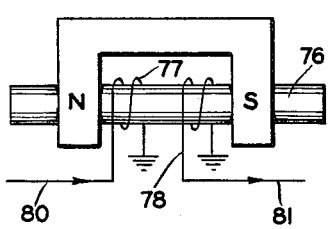
Fig. 2 is one form of a narrow band filter employing magnetostrictive elements.

One of the major problems in all frequency modulated systems employed for nondestructive testing of material is the identification of signals from defects lying at various depths. In general, the conventional frequency modulated system requires some way of indicating signals from various depths. All the previous frequency modulated systems use a single frequency filter to detect a specified beat frequency which is indicative of the depth of a flaw. It is necessary constantly to feed the same beat frequency into the filter. In order to indicate signals from various depths, it is necessary to change some other parameter in the system before the signal reaches the filter, and that parameter may be the beginning and the end points of the frequency sweep. However, it may be the electrical delay or it can be obtained by an acoustical delay. Because a single filter is used generally in the previously mentioned systems, it is necessary to wait for the signal in the filter to decay, stop "ringing," or die down before another depth in the material can be tested. Therefore, it is impossible to utilize a high Q filter because of inherent "ringing." Therefore, in previous frequency modulated systems, a low Q filter was used, so that the signal fed into the filter would decay fast. However, the low Q filter implies that the filter will pass a relatively large band of frequencies. Therefore, if it will pass a relatively large band of frequencies, the depth resolution is very poor. The present invention substitutes for the single fixed frequency filter a multiplicity of sequentially arranged filters, each one of which is for a different frequency and is a very high Q filter. The output of the filters is periodically scanned in sequential relation to completely cover the depth of the material being tested.

Referring to the drawings, and more particularly to Figs. 1 and 5, there is shown a frequency modulated system having a combination block and schematic diagram of the general type shown in copending patent application Ser. No. 522,542, for "Methods and Apparatus for Measuring Wave Propagation Time," the assignee of said copending patent application being the same as the assignee of the instant application.

In Fig. 1, there is presented an embodiment of the invention wherein there is shown a timing pulse generator 12, which provides a series of equally spaced pulses which control the sequence of operations in the apparatus. The timing pulse generator is a variable repetition rate type and the rate or periodicity of the pulses is controlled by the voltage which is produced by variable voltage source 14. The variable voltage source 14 may comprise a potentiometer 16 which is connected across a source of potential 18 and which is driven by a motor 20, or it may be a conventional electronic sweep generator which provides periodic voltage excursions.

The timing pulses are applied to a sweep generator 22. The sweep generator produces voltage excursions having saw-tooth wave form in synchronism with the timing pulses from generator 12.

The output of the sweep generator 22 is fed to a reactance tube circuit 36, with the output of the reactance tube circuit being fed to an oscillator 38. The output signal from the oscillator comprises the frequency modulated signal and is applied to a power amplifier 66, which is a variable gain type. The output of the power amplifier 66 is connected to a crystal or other transducer 44, which serves to transmit and receive ultrasonic signals, with said crystal or other transducer being connected to ground in the conventional manner as shown by symbol. Also, it is possible to use two crystals side by side.

The echo signal from the transducer 44 is fed into the amplifier 52 and thence into the material testing depth scanner 70. The output of the depth scanner is fed through a detector 58 and thence through a video amplifier 60. The variable voltage source 14, as shown in Fig. 5, has a single output which is shown connected from the variable resistance element of the potentiometer 16.

Block 14 in Fig. 1 shows this same single electrical output coming from the top of the block 14 and also from the bottom of block 14, but it is to be understood that both lines are connected to the single electrical variable voltage source output.

The variable voltage source 14 has its output connected to one of the horizontal deflecting plates of the cathode ray tube 62. One of the vertical deflecting plates of the cathode ray tube is connected to the output of the video amplifier 60. The remaining horizontal and vertical deflecting plates are connected together and to a common ground.

The output of the variable voltage source 14 is also connected to the timing pulse generator 12, as heretofore explained, and also to the filters and scanner 71 for synchronization therewith. A fixed oscillator 72 has its output fed into a mixer 73, which mixer is also connected with the output from the amplifier 52. The output of the mixer 73 is connected to the filters and scanner 71. The output from the filters and scanner 71 is fed to the detector 58.

Figure 4:
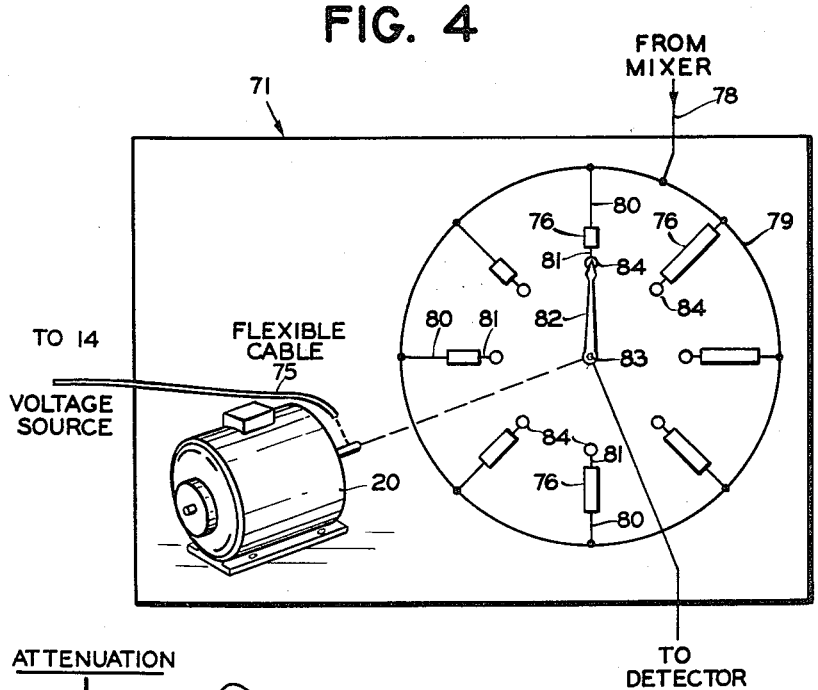
Fig. 4 is one version of the material testing depth scanner employing a multiplicity of filters arranged for sequential scanning.

In the arrangement shown in Fig. 1, the electrical output of variable voltage source 14 is connected to and synchronized with a scanner such as 71, as shown, and this connection, while represented as being an electrical connection in Fig. 1, may be either electrical or mechanical, the latter arrangement being shown in Fig. 4. However, a single motor, such as 20, may be used to drive the variable voltage source 14 and the scanner as shown in Figs. 4 and 5, respectively.

In Fig. 4, the flexible shaft 75 is connected from the shaft of the motor 20 and is used to drive the rotatable arm 85 which rotates relative to the rheostat winding 16 shown in Fig. 5.

In Fig. 2 there is shown one of the representative filters employing magnetostrictive rods. A magnetostrictive element 76 is shown having a magnetostrictive rod 77 directly connected therewith, with windings 77 and 78 positioned on the core. The narrow band filters are constructed by using two windings on the magnetostrictive rods, with one of the windings being a driving element and the other of said windings acting as the pickup element. Each of the magnetostrictive rods selected is for a particular frequency.

The magnetostrictive rods and the other elements are designed so that the rod vibrates at its natural frequency. Therefore, a multiplicity of filters, each having representative rods 76, are shown in a filter arrangement in Fig. 4, wherein it will be noted that each of the rods 76 is of different length and progresses increasingly in size from the one in the center top portion of Fig. 4, counterclockwise, to a rod several times the length of the one in the center top portion. The filters and scanner shown in 71 have a conductor 78, which comes from the mixer 73 and is connected to a conductor which is represented as being substantially a circular conductor 79. The input conductor 80 and the output conductor 81 of Fig. 2 are represented merely by the input conductor 80 and the output conductor 81 associated with each of the representative magnetostrictive rods 76. The arrangement shown in Fig. 4, in connection with the magnetostrictive rods 76, is merely schematic to show that the rotary arm 82, which is pivoted at point 83, will scan the group of contacts 84 as the motor 20 is rotated for scanning of the filters.

While Fig. 4 shows eight filters, it is to be understood that the number of filters employed will be determined by the depth of material to be scanned and the desired resolution. For example, to scan a sample whose depth is 10" with a resolution of .1", 100 filters would be required. The preferred frequency pass band of each filter should be 100 cycles. The "Q" of each filter could approach 5,000. The resonant frequencies of the filters should range from 100.1 to 110.0 kilocycles. A desirable scanning rate for this system may be 100 cycles per second. This will require the sweep generator 22 to have a total frequency sweep of 10 kilocycles. The frequency of transducer 44 would be 5 megacycles. Thus, the end points of the frequency sweep would be 4.95 to 5.05 megacycles.

While a specific scanning rate has been mentioned, it should be understood that any conveniently available scanning rate may be used. One hundred filters have been described for resolution of .1" in 10". This is arbitrary and depends upon the specific problem at hand, and may be varied accordingly, using more filters for greater resolution and less filters if less resolution is acceptable.

While simple windings are shown in the representative filter of Fig. 2, it is to be understood that capacitors and other components may be used in conjunction with the respective filters to provide a suitable network depending on the particular results desired.

Figure 3:
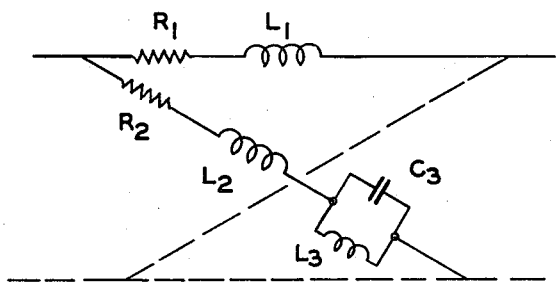
Fig. 3 is an equivalent circuit for the device shown in Fig. 2.
Figure 6:
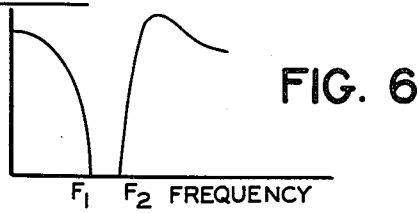
Fig. 6 shows a typical frequency response curve.

Fig. 3 shows resistors R1, R2, inductances L1 and L2, and a parallel arrangement of an inductor and a capacitor L3 and C3, respectively. The presentation in Fig. 3 is a representative equivalent circuit for the circuit shown in Fig. 2. In Fig. 6, a pair of curves are shown for frequency F1 and F2. This shows the attenuation plotted against the frequency for a narrow band filter using two windings on a magnetostrictive rod as represented. The curves show that the attenuation below F1 and above F2 is too high to pass frequencies outside of this range through the respective filters. Consequently, only the frequencies between F1 and F2 will pass the respective filters, so that each filter is a narrow band filter. By the scanning arrangement of the present invention there is utilized a system that permits a large number of narrow band filters to be scanned, whereby the system may be used for precision scanning. From the foregoing, with the exception of the block 71, representative of filters and scanner, substantially all of the other blocks are similar to those well known in the art. The materials testing depth scanner using the fixed oscillator and mixer, along with the filters and scanner, is new, particularly as presented in the arrangement shown.

In operation, if there are a series of defects at various depths within the work piece under test, a series of corresponding beat frequencies will appear at the output amplifier 52. The output of amplifier 52 is beat against the fixed oscillator 72 in order to provide beat frequencies consistent with the frequency response of the filters such as 76. Each filter such as 76 consists of a series of high Q magnetostrictive rods, with each rod acting as a very narrow band pass filter with a frequency response similar to that shown in Fig. 3. The outputs from the respective filters are sampled by the scanning mechanism represented in Fig. 4, which is synchronized with the variable voltage source 14. A signal appearing at the output of a filter represents a defect at a specified depth. The type and quantity of the filters connected in the scanning arrangement will be selected for the particular depth and material to be scanned.

The electronic sweep generator which may be used in lieu of the variable voltage source may be of the bootstrap type or may be an operational amplifier electronic sweep generator. Further, while a single transducer 44 is presented herein, it is to be understood that two crystals may be utilized, one acting as a transmitter and the other as a receiver. Further, it is to be understood that this system will work equally well for immersion, contact, or angle beam testing.

Although several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. In an apparatus for ultrasonically inspecting an object to determine the presence and location of any defect in the object, in combination, frequency generator means for generating a frequency modulated signal; transducer means responsive to said frequency modulated signal for producing an ultrasonic signal proportional thereto, said ultrasonic signal being transmitted into the object under test and producing reflected ultrasonic signals from any surface portions of said object and from defects in the object, said transducer means being responsive to any reflected ultrasonic signals to thereby generate an electrical output signal proportional thereto; means for generating a standard frequency signal; means for mixing said standard frequency signal with said electrical output signal to produce a beat signal having a frequency proportional to the distance between the defect from which said signal is reflected and said transducer means; a plurality of high-Q narrow pass band filters, each of said filters being tuned to a different frequency; means for sequentially applying said beat signal to each of said filters; and means for displaying any signals passing through any one of said filters.

2. In an apparatus for ultrasonically inspecting an object to determine the presence and location of any defect in the object, in combination, frequency generator means for generating a frequency modulated signal; transducer means responsive to said frequency modulated signal for producing an ultrasonic signal proportional thereto, said ultrasonic signal being transmitted into the object under test and producing reflected ultrasonic signals from any surface portions of said object and from defects in the object, said transducer means being responsive to any reflected ultrasonic signals to thereby generate an electrical output signal proportional thereto; means for generating a standard frequency signal; means for mixing said standard frequency signal with said electrical output signal to produce a beat signal having a frequency proportional to the distance between the defect from which said signal is reflected and said transducer means; a plurality of high-Q narrow pass band magnetostrictive filters, each of said filters being tuned to a different frequency; means for sequentially applying said beat signal to each of said filters; and means for displaying any signals passing through any one of said filters.

References Cited in the file of this patent

UNITED STATES PATENTS

| | | |
|---|---|---|
| 2,436,672 | Sanders | Feb. 24, 1948 |
| 2,593,865 | Erdman | Apr. 22, 1952 |
| 2,769,158 | Schultz | Oct. 30, 1956 |